(12) United States Patent
Gray et al.

(10) Patent No.: US 7,566,194 B1
(45) Date of Patent: Jul. 28, 2009

(54) RATCHETING APPARATUS FOR CARGO STRAP WINCHES

(76) Inventors: Lesley A. Gray, 59 O'Brien Street, Yass (AU) NSW2582; Paul L. Baker, 59 O'Brien Street, Yass (AU) NSW2582

( * ) Notice: Subject to any disclaimer, the term of this patent is extended or adjusted under 35 U.S.C. 154(b) by 536 days.

(21) Appl. No.: 11/539,795

(22) Filed: Oct. 9, 2006

(51) Int. Cl.
*B60P 7/08* (2006.01)
(52) U.S. Cl. .................. 410/103; 410/100; 410/156
(58) Field of Classification Search ............. 410/12, 410/96, 100, 103, 156; 16/406, 422, 427; 74/544, 545, 548; 254/223, 243; 81/177.2, 81/177.7, 177.85, 177.9; 7/168
See application file for complete search history.

(56) References Cited

U.S. PATENT DOCUMENTS 5,775,175 A    7/1998  Salemno et al.
6,102,637 A    8/2000  Mocci
6,139,233 A *  10/2000 Wilsey ................. 410/100
6,467,755 B2   10/2002 Reilly et al.

* cited by examiner

*Primary Examiner*—Stephen Gordon
(74) *Attorney, Agent, or Firm*—Crossley Patent Law; Mark A. Crossley

(57) ABSTRACT

A ratcheting apparatus for engaging the winch driver of a winch used for tightening cargo straps, providing secure temporary engagement, with substantial leverage for turning the winch. The apparatus comprises a handle that removably inserts into the two sleeves of the apparatus. The teeth of the sleeves are arranged such that loosening motion allows the teeth of the respective sleeves to slip, one against the other, where winch tightening motion causes the teeth to engage and tighten a cargo strap. The spring of the rod of the apparatus provides correct tension between the two sleeves. A hardened leverage bar turns the apparatus. The apparatus is preferably made of metal or metal alloy, although more exotic polymers and matrixes may be used in construction.

20 Claims, 4 Drawing Sheets

RATCHETING APPARATUS FOR CARGO STRAP WINCHES

BACKGROUND OF THE INVENTION

Cargo straps are commonly used on trucks, especially flat bed trucks, to secure loads. Various winch devices are used, with some more prevalent than others. Many such winches include a projecting portion with one or more radial holes for using a lever or lever bar of a chosen type to wind the winch, thereby tightening straps. One problem with strap winches is that operators often use any available bar or the like to tighten the winches. Often, any available bar or the like is used to tighten the winches, with the winches and the bars suffering the expected damage therewith associated. A number of devices have been provided to assist in winding such winches. Many of these devices do not offer proper winch driver engagement, nor sufficient leverage for tightening the winch straps. The devices known do not incorporate the advantages of the present ratcheting apparatus used in winding the winches of cargo straps.

FIELD OF THE INVENTION

The ratcheting apparatus for cargo strap winches relates to devices used in winding winches for securing trailer straps and therefore trailer cargo, and more especially to a ratcheting apparatus for cargo strap winches which offers secure, quick engagement and disengagement from a winch, and proper leverage for tightening winch straps.

DESCRIPTION OF THE PRIOR ART

Prior related art U.S. Pat. No. 6,467,755 issued to Reilly et al. on Oct. 22, 2002 teaches a power driven winch winding tool. The tool being power driven differs from the present leverage bar apparatus. U.S. Pat. No. 5,775,175 issued to Salemno et al. on Jul. 7, 1998 teaches a device for winding a crank and associated method. The device is geared and does not provide the same engagement or drive method of the present apparatus. U.S. Pat. No. 6,102,637 issued to Mocci on Aug. 15, 2000 teaches a flatbed wind winding bar that engages a winch. The bar does not provide the leverage nor the ratcheting action of the present apparatus.

While the above-described devices fulfill their respective and particular objects and requirements, they do not describe a ratcheting apparatus for cargo strap winches that provides for the advantages of the present ratcheting apparatus for cargo strap winches. In this respect, the ratcheting apparatus for cargo strap winches substantially departs from the conventional concepts and designs of the prior art. Therefore, a need exists for an improved ratcheting apparatus for cargo strap winches.

SUMMARY OF THE INVENTION

The general purpose of the ratcheting apparatus for cargo strap winches, described subsequently in greater detail, is to provide a ratcheting apparatus for cargo strap winches which has many novel features that result in an improved ratcheting apparatus for cargo strap winches which is not anticipated, rendered obvious, suggested, or even implied by prior art, either alone or in combination thereof.

To attain this, the ratcheting apparatus for cargo strap winches provides an apparatus for engaging the winch driver of a winch used for tightening cargo straps. The apparatus provides secure temporary engagement, with substantial leverage for turning the winch. The apparatus comprises a handle that removably inserts into the two sleeves of the apparatus. The teeth of the sleeves are arranged such that loosening motion allows the teeth of the respective sleeves to slip, one against the other, where winch tightening motion causes the teeth to engage and tighten a cargo strap. The spring of the rod of the apparatus provides correct tension between the two sleeves to provide the above-described function. The apparatus further comprises a leverage bar of sufficient strength to prevent bending in use in turning the apparatus. The cross bar which engages the engagement sleeve of the apparatus with the winch driver is of a strong metal alloy, preferably. The apparatus is preferably made of metal or metal alloy, although more exotic polymers and matrixes may be used in construction.

Thus has been broadly outlined the more important features of the improved ratcheting apparatus for cargo strap winches so that the detailed description thereof that follows may be better understood and in order that the present contribution to the art may be better appreciated.

An object of the ratcheting apparatus for cargo strap winches is to quickly engage and disengage a winch driver.

Another object of the ratcheting apparatus for cargo strap winches is to securely engage a winch driver.

A further object of the ratcheting apparatus for cargo strap winches is to provide sufficient leverage to fully tighten cargo straps.

An added object of the ratcheting apparatus for cargo strap winches is to provide a ratcheting action so that the leverage bar need not be removed from the apparatus when tightening.

And, an object of the ratcheting apparatus for cargo strap winches is to prevent damage to winch drivers.

These together with additional objects, features and advantages of the improved ratcheting apparatus for cargo strap winches will be readily apparent to those of ordinary skill in the art upon reading the following detailed description of presently preferred, but nonetheless illustrative, embodiments of the improved ratcheting apparatus for cargo strap winches when taken in conjunction with the accompanying drawings.

In this respect, before explaining the current embodiments of the improved ratcheting apparatus for cargo strap winches in detail, it is to be understood that the ratcheting apparatus for cargo strap winches is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved ratcheting apparatus for cargo strap winches. It is therefore important that the claims be regarded as including such equivalent constructions insofar as they do not depart from the spirit and scope of the ratcheting apparatus for cargo strap winches. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the ratcheting apparatus for cargo strap winches generally designated by the reference number 10 will be described.

Figure 1:
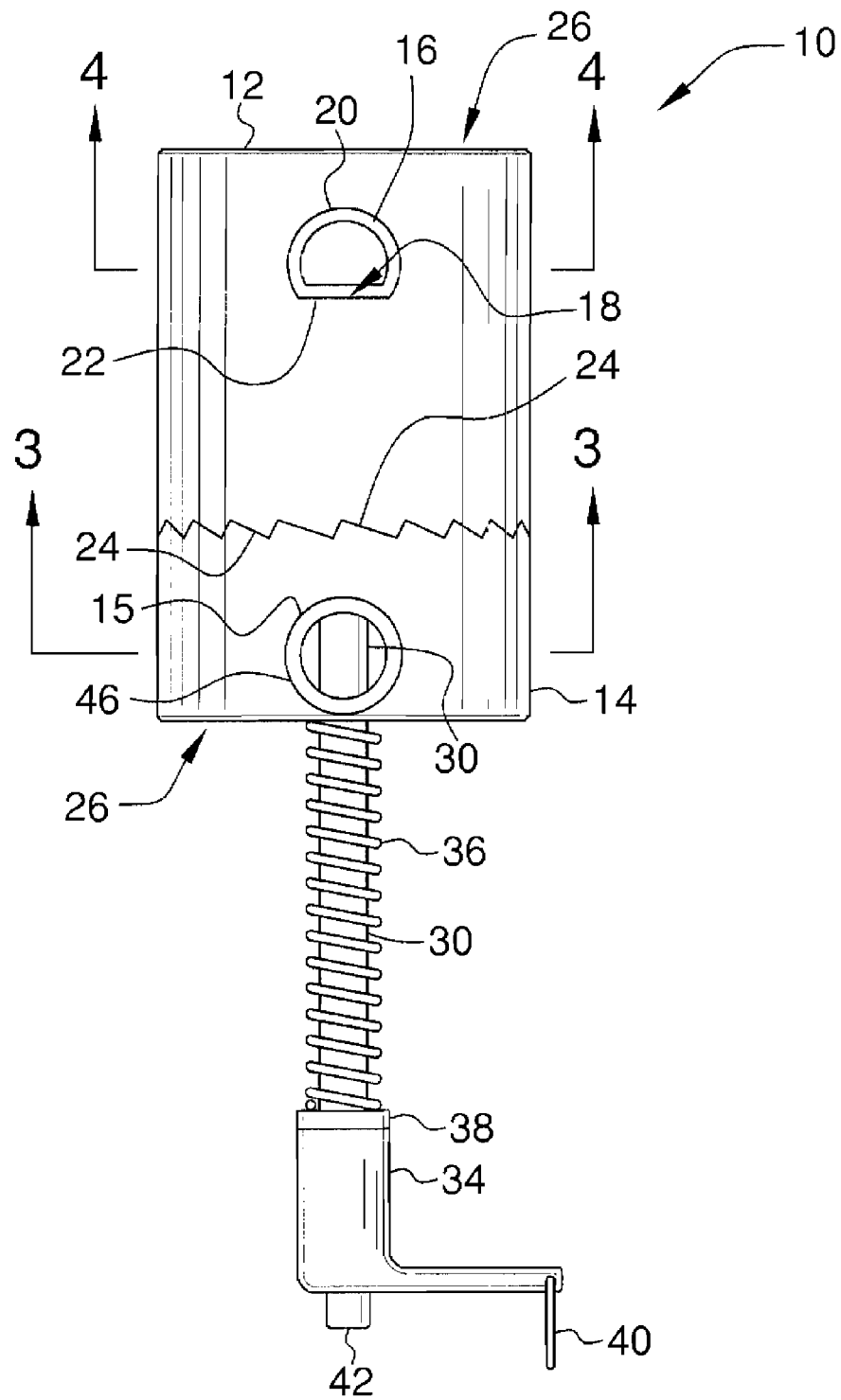
FIG. 1 is a side elevation view of the assembled apparatus.
Figure 2:
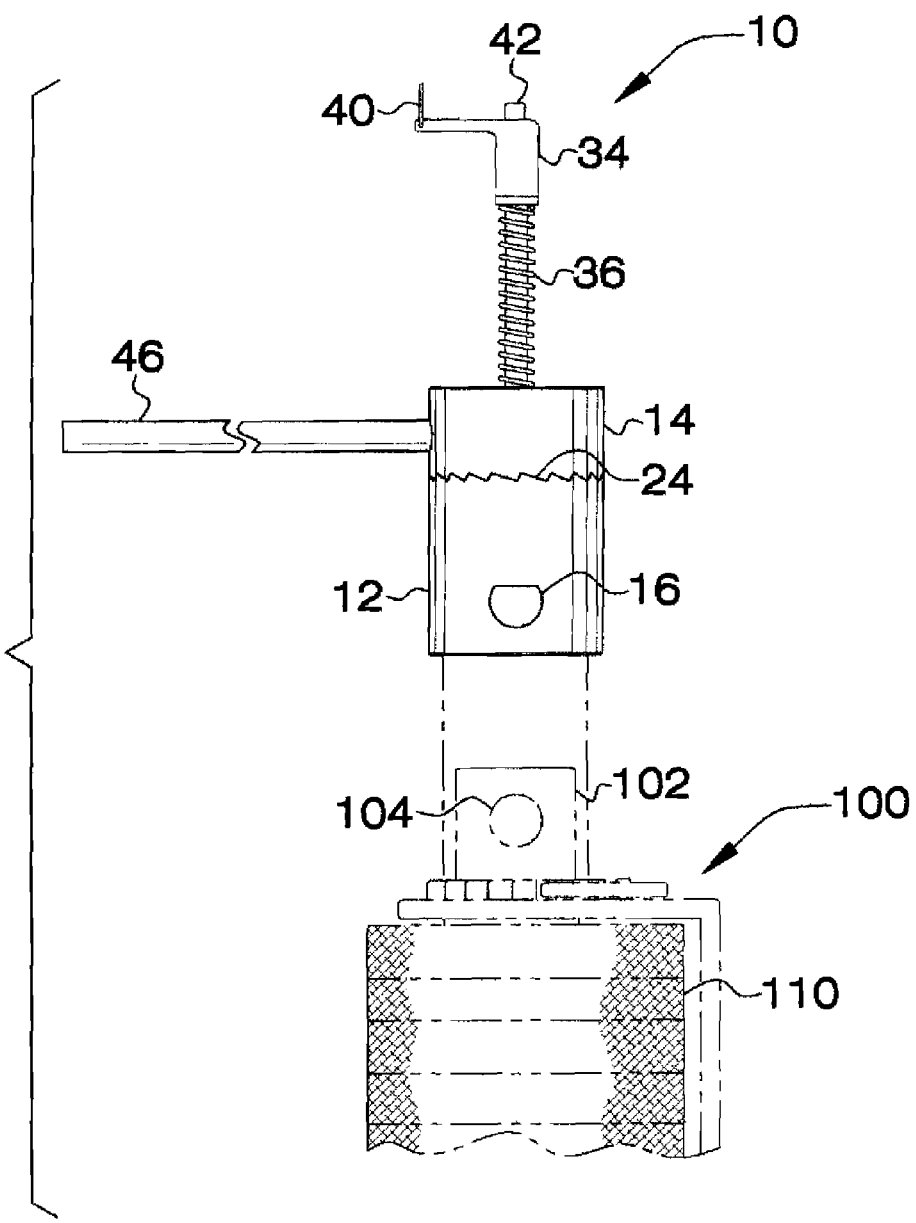
FIG. 2 is a side elevation view of the apparatus in preparation of engagement with a winch.

Referring to FIGS. 1 and 2, the ratcheting apparatus 10 for engaging a driver 102 of a cargo strap 110 winch 100 comprises a cylindrical engagement sleeve 12. The engagement sleeve is for fitting over the driver 102 of the winch 100. The engagement sleeve 12 has a diameter, a first end and a second end. An orifice 16 is disposed in an each side of the engagement sleeve 12. The orifices 16 are proximal to the first end of the engagement sleeve 12. The cross bar 20 is for removable fit through the orifices 16 and thence through any of a plurality of drive holes 104 in the winch driver 102. Each orifice 16 is preferably comprised of one orifice flat side 18. The cross bar 20 is preferably comprised of one matching cross bar flat side 22, providing a secure, removable cross bar 20 fit within the orifice 16. A series of teeth 24 is disposed on the second end of the engagement sleeve 12. A plate 26 is disposed within the engagement sleeve 12. The plate 26 substantially fills the inner diameter of the engagement sleeve 12. The ratcheting sleeve 14 is of an equal diameter to the engagement sleeve 12. The ratcheting sleeve 14 has a first end and a second end. A series of teeth 24 is disposed on the first end of the ratcheting sleeve 14. The ratcheting sleeve 14 teeth 24 are for engaging the teeth 24 of the engagement sleeve 12. The engagement sleeve 12 teeth 24 and the ratcheting sleeve 14 teeth 24 cumulatively ratchet freely in a one direction and engage in an opposite direction. The teeth 24 engage in a tightening movement for the winch 100. A pair ratcheting sleeve 14 openings 15 is disposed in the ratcheting sleeve 14. The openings 15 are proximal to the second end of the ratcheting sleeve 14.

Figure 3:
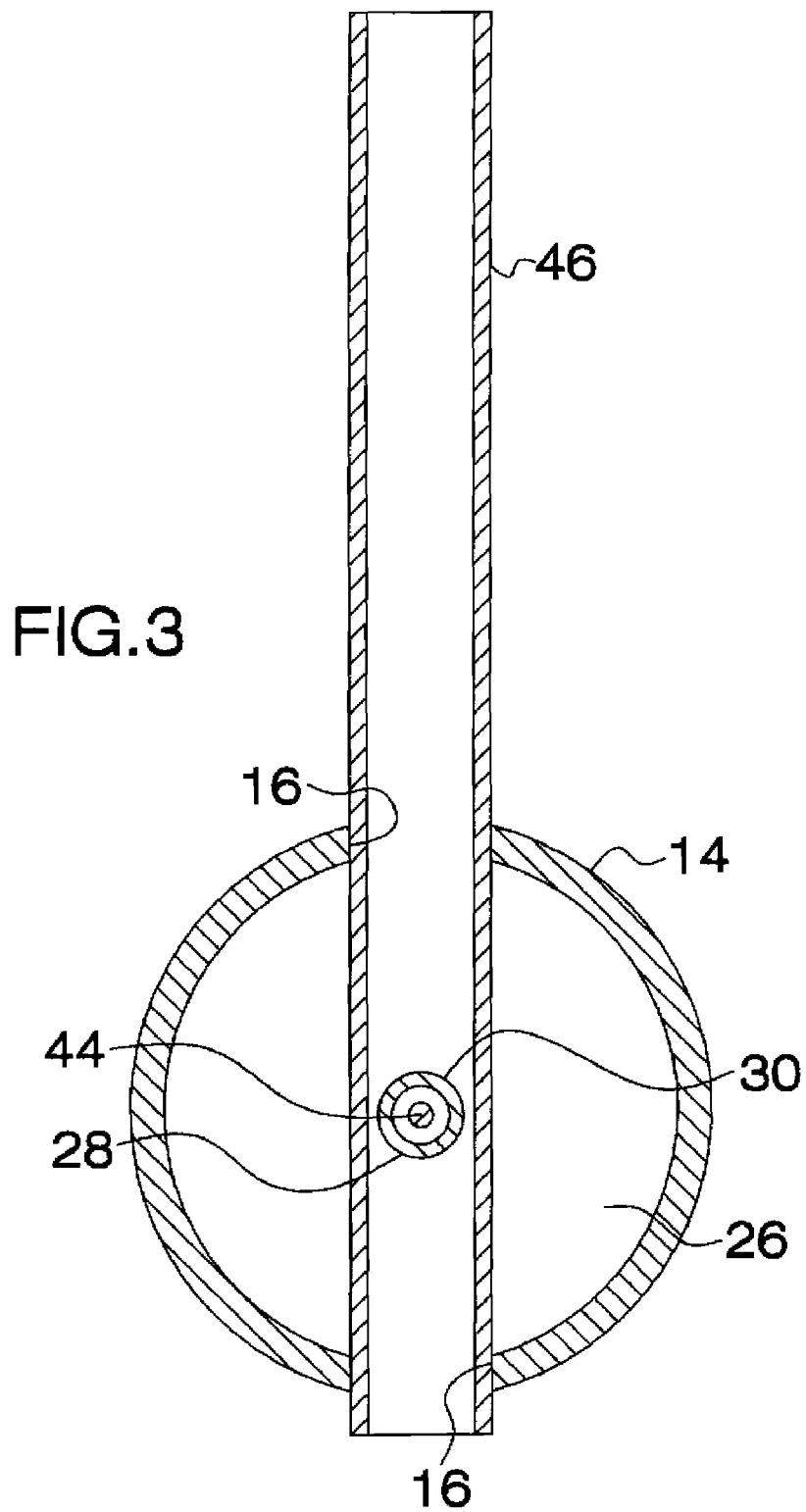
FIG. 3 is a partial cross sectional view of FIG. 1.
Figure 4:
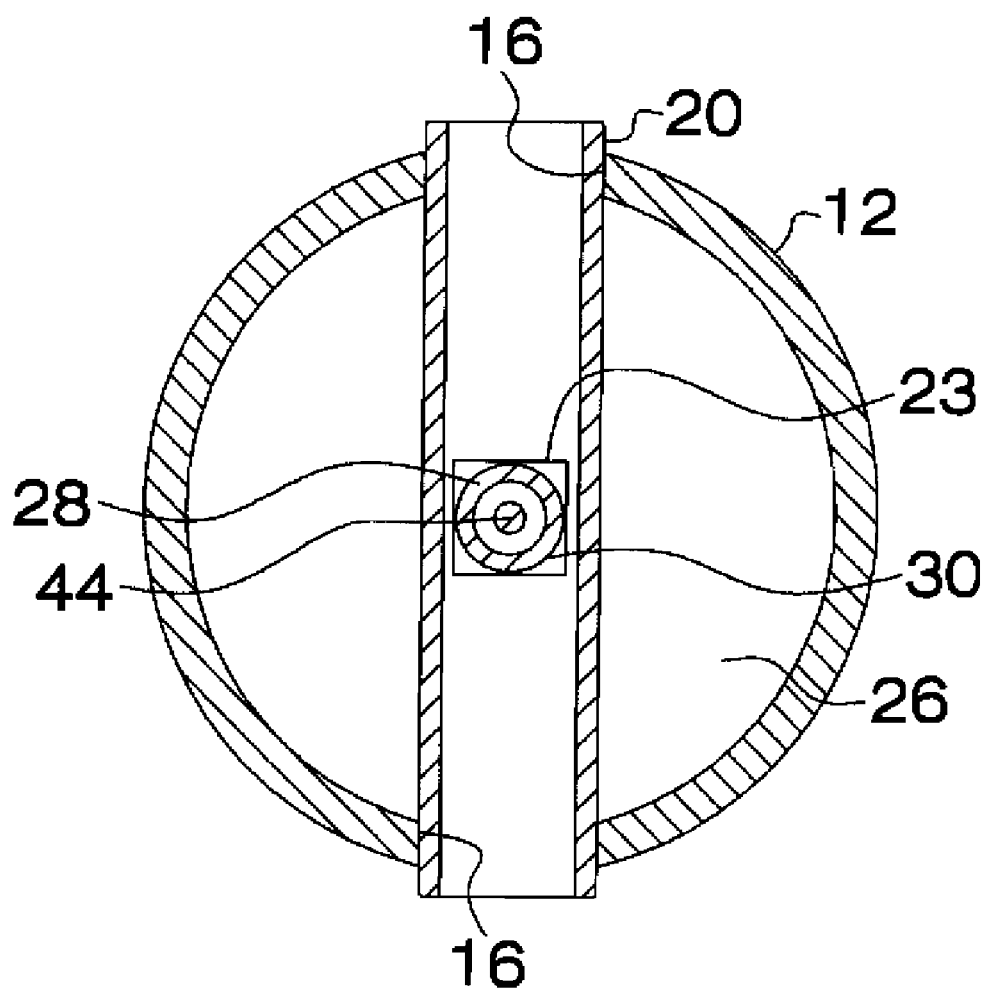
FIG. 4 is a partial cross sectional view of FIG. 1.

The apparatus 10 is further comprised of a rod 30. The rod 30 has a first end, a second end, and a length therebetween. The rod 30 is for removable insertion through the plate foramen 28 of FIG. 3 of the engagement sleeve 14 and the ratcheting sleeve 12 plate 26 foramen 28 of FIG. 4. The handle 34 is disposed on the second end of the rod 30. The spring 36 freely encircles a substantial area of the length of the rod 30. A release pin 44 of FIGS. 3 and 4 is disposed within the length of the rod 30. The release button 42 is disposed on the handle 34. The leverage bar 46 fits within the ratcheting sleeve 14 openings 15. The leverage bar 46 is of a metal of sufficient strength to resist bending in use. The leverage bar 46 metal is preferably hardened.

Referring to FIG. 3, the plate 26 is disposed within the ratcheting sleeve 14. The plate 26 substantially fills the inner diameter of the second end of the ratcheting sleeve 14. The foramen 28 is disposed in a center of the plate 26. The foramen 28 provides for removable insertion of the rod 30. The detent balls (not shown) of the rod 30 prevent removal of the rod 30 through the plate 26 until the release pin 44 of the rod 30 is depressed. The detent ball and functions of same are well known in the mechanical arts. More than one detent ball is disposed on the first end of the rod 30. Depression of the release button 42 moves the release pin 44 to release the detent balls.

Referring to FIG. 4, the engagement sleeve 12 comprises a plate 26. The plate 26 substantially fills the inner diameter of the engagement sleeve 12. A foramen 28 is disposed in the center of the plate 26. The foramen 28 slideably and removably receives the rod 30. The detent balls (not shown) of the rod 30 prevent removal of the rod 30 through the plate 26 until the release pin 44 of the rod 30 is depressed.

In use, the apparatus 10 is acquired and the engagement sleeve 12 removably fitted around the driver 102 of a winch 100. The cross bar 20 is fitted through one engagement sleeve orifice 16, thence through the drive holes 104 of a winch 100 driver 102, thence through the opposite engagement sleeve orifice 16. Although the engagement sleeve 12 and ratcheting sleeve 14 are separable, it is customary to leave the two engaged together by the detent balls of the rod 30. The ratcheting sleeve 14 is thereby engaged with the engagement sleeve 12 via the teeth 24 of each. The spring 36 of the rod 30 provides correct engagement tension. The spring base 38 provides a spring contact surface against the handle 34. The apparatus 10 is removably fitted to the winch 100 driver 102. The cross bar passage 23 allows leverage bar 46 fit. The leverage bar 46 is then used to tighten the strap 110 on a winch 100. Once straps 110 are tightened, the cross bar 20 is removed to allow removal of the apparatus 10 from the winch 100. The apparatus 10 can be hung on a tool rack or the like by the handle ring 40 for convenience.

With respect to the above description then, it is to be realized that the optimum dimensional relationships for the parts of the ratcheting apparatus for cargo strap winches, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the ratcheting apparatus for cargo strap winches.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the ratcheting apparatus for cargo strap winches may be used.

Therefore, the foregoing is considered as illustrative only of the principles of the ratcheting apparatus for cargo strap winches. Further, since numerous modifications and changes will readily occur to those skilled in the art, it is not desired to limit the ratcheting apparatus for cargo strap winches to the exact construction and operation shown and described, and accordingly, all suitable modifications and equivalents may be resorted to, falling within the scope of the ratcheting apparatus for cargo strap winches.

What is claimed is:

1. A ratcheting apparatus for engaging a driver of a cargo strap winch, the apparatus comprising:
   a cylindrical engagement sleeve for fitting over the driver, the engagement sleeve having a diameter, a first end and a second end;
   means for selectively engaging the winch driver with the engagement sleeve;
   a series of teeth on the second end of the engagement sleeve;
   a ratcheting sleeve of an equal diameter to the engagement sleeve diameter, the ratcheting sleeve having a first end and a second end;
   means for tensionally holding the engagement sleeve in ratcheting contact with the ratcheting sleeve;
   a series of teeth on the first end of the ratcheting sleeve, the ratcheting sleeve teeth for engaging the teeth of the engagement sleeve, the engagement sleeve teeth and the ratcheting sleeve teeth cumulatively ratcheting freely in one direction and engaging in an opposite direction;

a pair ratcheting sleeve openings in the ratcheting sleeve, the openings proximal to the second end of the ratcheting sleeve.

2. The apparatus in claim 1 wherein the means for engaging the driver comprises an orifice in each one of sides of the engagement sleeve, the orifices proximal to the first end of the engagement sleeve;
a cross bar for removable fit through the orifices and any of a plurality of drive holes in the winch driver.

3. The apparatus in claim 2 wherein the cross bar further comprises a flat side;
a corresponding flat side being on the engagement sleeve orifices.

4. The apparatus in claim 1 wherein the apparatus further comprises a leverage bar fitted within the ratcheting sleeve openings.

5. The apparatus in claim 2 wherein the apparatus further comprises a leverage bar fitted within the ratcheting sleeve openings.

6. The apparatus in claim 3 wherein the apparatus further comprises a leverage bar fitted within the ratcheting sleeve openings.

7. A ratcheting apparatus for engaging a driver of a cargo strap winch, the apparatus comprising:
a cylindrical engagement sleeve for fitting over the driver, the engagement sleeve having a diameter, a first end and a second end;
a means for selectively engaging the winch driver with the engagement sleeve;
a series of teeth on the second end of the engagement sleeve;
a plate within the engagement sleeve, the plate substantially filling an inner diameter of the engagement sleeve, the plate disposed at the first end of the engagement sleeve;
a foramen in a center of the plate;
a ratcheting sleeve of an equal diameter to the engagement sleeve diameter, the ratcheting sleeve having a first end and a second end;
a series of teeth on the first end of the ratcheting sleeve, the ratcheting sleeve teeth for engaging the teeth of the engagement sleeve, the engagement sleeve teeth and the ratcheting sleeve teeth cumulatively ratcheting freely in one direction and engaging in an opposite direction;
a pair ratcheting sleeve openings in the ratcheting sleeve, the openings proximal to the second end of the ratcheting sleeve;
a plate within the ratcheting sleeve, the ratcheting sleeve plate substantially filling an inner diameter of the second end of the ratcheting sleeve;
a foramen in a center of the ratcheting sleeve plate;
a rod having a first end, a second end, and a length therebetween, the rod for removable insertion through each plate foramen of the engagement sleeve and the ratcheting sleeve;
a means for holding the rod within each foramen of the engagement sleeve and the ratcheting sleeve;
a leverage bar fitted within the ratcheting sleeve openings.

8. The apparatus in claim 7 wherein the rod comprises:
more than one detent ball on the first end of the rod;
a handle on the second end of the rod;
a spring freely encircling a substantial area of the length of the rod;
a release pin within the length of the rod;
a release button on the handle, the release button for moving the release pin in releasing the detent balls.

9. The apparatus in claim 8 wherein the rod handle further comprises a handle ring.

10. The apparatus in claim 7 wherein the means for selectively engaging the winch driver with the engagement sleeve comprises:
an orifice in each one of sides of the engagement sleeve, the orifices proximal to the first end of the engagement sleeve;
a cross bar for removable fit through the orifices and any of a plurality of drive holes in the winch driver.

11. The apparatus in claim 8 wherein the means for selectively engaging the winch driver with the engagement sleeve comprises:
an orifice in each one of sides of the engagement sleeve, the orifices proximal to the first end of the engagement sleeve;
a cross bar for removable fit through the orifices and any of a plurality of drive holes in the winch driver.

12. The apparatus in claim 10 wherein the cross bar further comprises a flat side;
a corresponding flat side being on the engagement sleeve orifices.

13. The apparatus in claim 11 wherein the cross bar further comprises a flat side;
a corresponding flat side being on the engagement sleeve orifices.

14. The apparatus in claim 7 wherein the leverage bar is a hardened leverage bar fitted within the ratcheting sleeve openings.

15. The apparatus in claim 8 wherein the leverage bar is a hardened leverage bar fitted within the ratcheting sleeve openings.

16. The apparatus in claim 9 wherein the leverage bar is a hardened leverage bar fitted within the ratcheting sleeve openings.

17. The apparatus in claim 10 wherein the leverage bar is a hardened leverage bar fitted within the ratcheting sleeve openings.

18. The apparatus in claim 11 wherein the leverage bar is a hardened leverage bar fitted within the ratcheting sleeve openings.

19. The apparatus in claim 12 wherein the leverage bar is a hardened leverage bar fitted within the ratcheting sleeve openings.

20. The apparatus in claim 13 wherein the leverage bar is a hardened leverage bar fitted within the ratcheting sleeve openings.

* * * * *